R. F. DURYEA.
VEHICLE SIGNALING DEVICE.
APPLICATION FILED DEC. 29, 1915.
1,208,302.
Patented Dec. 12, 1916.
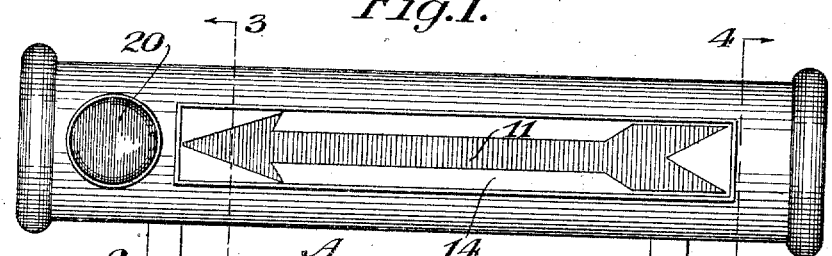
Fig.1.
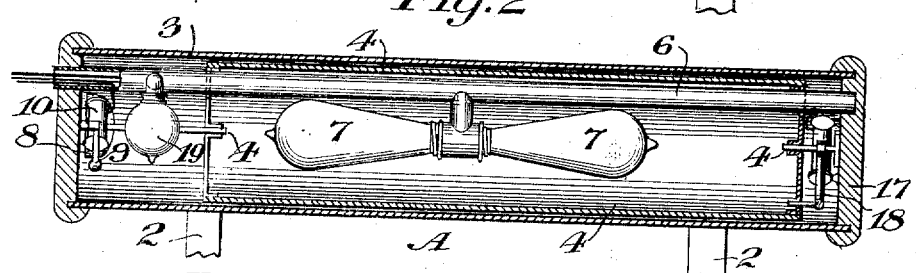
Fig.2.
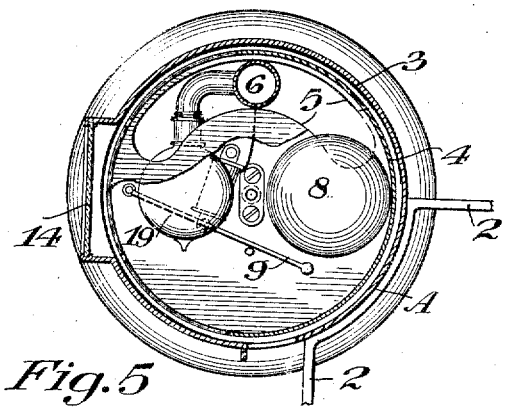
Fig.5.
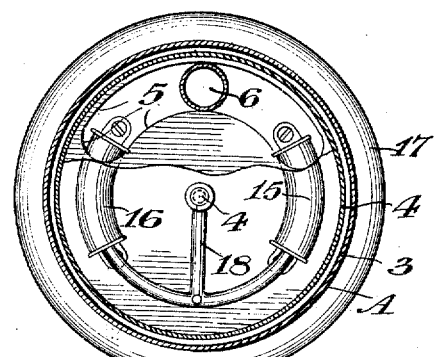
Fig.6.
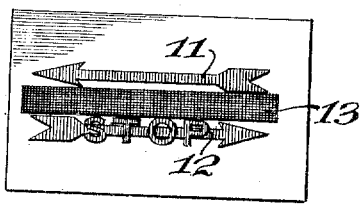
WITNESSES:
L. J. Forde.
Arne Hinholt.
INVENTOR
Robert F. Duryea
BY Strong & Townsend.
ATTORNEYS

UNITED STATES PATENT OFFICE.

ROBERT F. DURYEA, OF SAN FRANCISCO, CALIFORNIA.

VEHICLE SIGNALING DEVICE.

1,208,302.  Specification of Letters Patent.  Patented Dec. 12, 1916.

Application filed December 29, 1915. Serial No. 69,196.

*To all whom it may concern:*

Be it known that I, ROBERT F. DURYEA, a citizen of the United States, residing in the city and county of San Francisco and State of California, have invented new and useful Improvements in Vehicle Signaling Devices, of which the following is a specification.

This invention relates to improvements in devices to be used in connection with vehicles, and especially those which are in advance, to signal following persons or vehicles that said advanced vehicle is about to turn to either one side or the other, or to stop, back, or to perform other maneuver.

The invention consists of a stationary outer and a concentric, turnable inner cylinder having marked upon it arrows or indications of the direction of turn about to be made or the stopping of the car, means for turning the cylinder to expose either of the indicating devices, and lights by which said devices are plainly shown.

It also comprises means for illuminating the register number and a bell or audible signal which may be operated in conjunction with the visible indicators.

Having reference to the accompanying drawings, Figure 1 is an exterior view, showing the outer cylinder and one of the indicators. Fig. 2 is a longitudinal section of the two cylinders, showing the interior mechanism. Fig. 3 is a section through line 3—3 of Fig. 1. Fig. 4 is a section through line 4—4 of Fig. 1. Fig. 5 is a view of the indicating marks.

As shown in the drawings, A is a casing, preferably cylindrical in shape and attached to the rear portion of an automobile or other vehicle by brackets, as at 2.

3 is a cylinder concentric within the cylinder A and pivoted, as at 4, so as to be turnable within the outer cylinder. This cylinder is sufficiently shorter than the cylinder A, to admit of operating mechanism between the ends of the two cylinders. The heads of the inner cylinder have circumferential, segmental slots 5, around the upper part, and through these slots extends a tube 6 which may contain the various electrical connecting wires necessary for the operation. From this tube and within the inner cylinder may be supported lamps 7, which, when in use, are electrically energized.

At one end of the apparatus is fixed a bell 8 and a hammer 9 is so pivoted to the head of the outer cylinder that it may be actuated to produce an audible signal. The actuating means may be a solenoid, electromagnet or other electrically actuated device, as at 10.

The indicating devices are here shown in the form of arrows 11 and 12 which are disposed horizontally upon the inner cylinder, one pointing to the right and the other to the left. Intermediately of these may be a darkened space, as at 13, which will indicate "clear". The front of the outer casing is provided with a glazed opening 14, directed toward the rear, and through which opening either one of the arrows or other indicators may be exposed. I have also arranged an opening downwardly through the case which allows the light to shine upon the register number, which will be fixed to brackets upon the machine below the indicating apparatus.

In order to operate the interior cylinder and present either of the arrows 11 or 12, I have shown solenoids 15 and 16 fixed to the inner end of the head 17 of the outer cylinder, which may be made of wood saturated with paraffin or otherwise rendered an electrical non-conductor. The solenoids 15 and 16 are curved to two arcs having the same radius as the cylinder and have cores that are connected together and to the pivot 4, as shown at 18.

Suitable conducting wires pass through the tube 6 and are led to the magnet, the opposite ends being connected with any suitable actuating device within reach of the operator, so that only by energizing one of said electromagnets the inner tube will be turned in one direction, or by energizing the other it may be turned in the opposite direction, or it may be left standing with the intermediate signal in position. When the inner cylinder has thus been turned, one of the indicators will be exhibited through the glass 14, so that anyone following the vehicle will be at once instructed as to the intention of its driver. The length of the cylinder should be approximately that of the number register, so that the light slot through the bottom will plainly expose the number of the preceding car.

A constant tail light and danger signal 19 is fixed at one end of the apparatus and is always visible through an opening 20 in the outer casing.

Having thus described my invention, what I claim and desire to secure by Letters Patent is—

In a vehicle signaling device, a cylindrical casing having closed ends and sight openings in its periphery, an inner cylinder having its ends closed and spaced from the ends of the casing to form end compartments, longitudinally arranged shafts fixed to the casing ends and rotatably supporting the inner cylinder, cylinder-rotating means arranged in one end compartment, between one end of the casing and the adjacent end of the cylinder, the ends of the cylinder being formed with arcuate slots arranged in proximity to the periphery of the cylinder, a source of light arranged in the other end compartment between the opposite ends of the casing and cylinder and visible through one of the sight openings, the adjacent closed end of the cylinder preventing the passage of light rays from said source of light into said cylinder, a source of light disposed in the cylinder and visible through another sight opening, and a tubular member fixed to each of the ends of the casing and passing through the arcuate slots of the ends of the inner cylinder to serve as a steadying means for the latter, said tubular member also having both sources of light connected thereto and constituting the sole support for the sources of light aforesaid.

In testimony whereof I have hereunto set my hand in the presence of two subscribing witnesses.

ROBERT F. DURYEA.

Witnesses:
JOHN H. HERRING,
W. W. HEALEY.